Patented May 25, 1943

2,319,918

UNITED STATES PATENT OFFICE 2,319,918

RUBBER HYDROCHLORIDE FILM

William C. Calvert, Chicago, Ill., assignor to Wingfoot Corporation, Wilmington, Del., a corporation of Delaware No Drawing. Application March 20, 1937, Serial No. 132,167

25 Claims. (Cl. 117—139)

This invention relates to an improvement in rubber hydrochloride films. It includes both the new product and the method of making it.

When a rubber hydrochloride film is prepared by spreading a rubber hydrochloride cement and then allowing the solvent to evaporate, unless the evaporation is carried out under carefully controlled conditions the film formed will not be entirely clear. The surface from which the solvent has been evaporated will be somewhat roughened or frosted and this will give the film a somewhat milky or cloudy appearance.

I have found that the clarity of such a film can be materially improved by treating the film with a dispersion or cement of a material such as cellulose acetate or a rubber product such as a condensation derivative of rubber. If the film is prepared on a perfectly smooth surface there is no necessity for applying the clarifying solution to the surface of the film which was formed in contact with the smooth surface. The other surface of the film, i. e., the surface from which the solvent has evaporated may be coated with the clarifying solution by brushing or spraying or the entire film may be dipped in the clarifying solution.

In one experiment a cellulose acetate coating of the following composition was employed:

| | |
|---|---|
| Cellulose acetate_____pounds__ | 1.5 |
| Condensation product prepared from 1 mol ethylene glycol and 1 mol phthalic anhydride _____pound__ | .75 |
| Ethyl lactate _____cc__ | 710 |
| Ethyl alcohol (95% alcohol denatured with 0.5% benzene _____cc__ | 975 |
| Methyl Cellosolve_____cc__ | 2,020 |
| Ethylene dichloride_____cc__ | 4,812 |

This was diluted with acetone until it was sufficiently thin to spread. An acetone solution of about 1.4% solid content or higher produced a clear film.

The rubber derivative which I prefer to employ is a condensation derivative which may advantageously be prepared by heating rubber in solution with the halide of an amphoteric metal or chlorostannic acid. The rubber derivative may for example be prepared as described in Sebrell U. S. Patent 2,052,423. Suitable products of this type are marketed by the Goodyear Tire & Rubber Company under the trade names Pliolite and Plioform. The solution of such a rubber derivative may be applied in any suitable solvent such as gasoline or benzene, etc. Waxes, oils, etc., may be added as desired. A three percent solution of this rubber derivative in gasoline containing 10% of paraffin ("Parawax") based on the weight of the rubber derivative is satisfactory. The rubber hydrochloride film may be dipped into such a solution and then drained and dried at about 80° C. for several minutes.

Rubber hydrochloride films were clarified by treating with a solution containing 2.7% of such a rubber derivative and 3% of "Parawax" in a high test gasoline with a boiling range of 40 to 145° C. One square yard of rubber hydrochloride film weighing 32.43 grams was dipped in such a solution and after drying at 60° C. for one minute was found to have an increased weight of 3.76%. Another sample dried for 45 minutes at 60° C. gave an increase in weight of 3.53%. Other rubber hydrochloride film dipped in such a clarifying solution increased in thickness from .00125" to .00131".

Sheets of rubber hydrochloride were passed into a clarifying solution containing 10% of such a rubber derivative and 1% of paraffin in a high test gasoline. The excess of clarifying solution was removed by running the treated film between ½" rods. The sheets were then dried at 170° C. Such film after drying was found to have taken up about .016 pound of the clarifying composition per pound of rubber hydrochloride.

The rubber hydrochloride may be prepared as described in Calvert 1,989,632. Photochemical inhibitors as there described are advantageously added to the rubber hydrochloride. The composition of the clarifying coating may be varied by the addition of various ingredients or the use of different rubber derivatives or other material such as cellulose acetate.

In this way the films may be readily clarified without injuring their durability as the clarified films may be subjected to ordinary handling without causing the clarifying composition to flake off.

I claim:

1. Rubber hydrochloride films composing a rubber hydrochloride base in film form having at least one surface formed with small irregularities which decrease the clarity of the film, said surface being covered with a clarifying composition, the resulting product being clear and free from any cloudiness which would otherwise be produced by the irregularities in the rubber hydrochloride surface.

2. A rubber hydrochloride film as defined in claim 1, the clarifying composition of which contains cellulose acetate.

3. A rubber hydrochloride film as defined in claim 1, the clarifying composition of which contains a condensation derivative of rubber.

4. The method of improving the clarity of a rubber hydrochloride film, in at least one surface of which are small irregularities which decrease the clarity of the film, which comprises covering such irregularities with a clarifying composition.

5. The method of claim 4 in which a clarifying composition comprising cellulose acetate is employed.

6. The method of claim 4 in which a clarifying composition comprising a condensation derivative of rubber is employed.

7. Transparent sheet material comprising a rubber hydrochloride base film having anchored firmly thereto a continuous coating containing an end product obtained from the reaction between rubber and a halide of an amphoteric metal.

8. The method of increasing the transparency and clarity of a sheet or film formed from rubber hydrochloride by casting a rubber hydrochloride solution onto a smooth surface, which comprises coating the opposite side of said sheet or film from that which contacted said smooth surface with a transparent film of an end product obtained by reacting a halide of an amphoteric metal with rubber.

9. The method of increasing the transparency and clarity of a sheet or film formed from rubber hydrochloride by casting a rubber hydrochloride solution onto a smooth surface, which comprises coating the opposite side of said sheet or film from that which contacted said smooth surface with a transparent film of an end product obtained by reacting tin tetrachloride with rubber.

10. The method of increasing the transparency and clarity of a sheet or film prepared by casting a rubber hydrochloride solution onto a smooth surface and drying the same, which comprises applying to said sheet or film a solution of a transparent film forming material including an end product obtained by the reaction of rubber and tin tetrachloride in a solvent that is not a solvent for rubber hydrochloride and evaporating said solvent therefrom to leave a continuous relatively thin pellicle over said rubber hydrochloride sheet or film.

11. The method of increasing the transparency and clarity of a sheet or film prepared by casting a rubber hydrochloride solution onto a smooth surface and drying the same, which comprises applying to said sheet or film a solution of a transparent film forming material including an end product obtained by the reaction of rubber and a halide salt of an amphoteric metal in a solvent that is not a solvent for rubber hydrochloride and evaporating said solvent therefrom to leave a continuous relatively thin pellicle over said rubber hydrochloride sheet or film.

12. Thin transparent flexible, self-sustaining sheet or film material suitable for wrapping purposes, comprising superimposed films integrally bonded together, one of said films being composed largely of rubber hydrochloride and another of an end product obtainable from the reaction between rubber and tin tetrachloride.

13. Transparent sheet material comprising a rubber hydrochloride base film having anchored firmly thereto a continuous coating containing a condensation derivative of rubber.

14. Transparent sheet material comprising a rubber hydrochloride base film having anchored firmly thereto a continuous coating containing a condensation derivative of rubber of the type obtainable by the reaction between rubber and a halide of an amphoteric metal.

15. The method of increasing the transparency and clarity of a sheet or film formed from rubber hydrochloride by casting a rubber hydrochloride solution onto a smooth surface, which comprises coating the opposite side of said sheet or film from that which contacted said smooth surface with a transparent film of a clarifying solution.

16. The method of increasing the transparency and clarity of a sheet or film formed from rubber hydrochloride by casting a rubber hydrochloride solution onto a smooth surface, which comprises coating the opposite side of said sheet or film from that which contacted said smooth surface with a transparent film of a condensation derivative of rubber.

17. The method of increasing the transparency and clarity of a sheet or film formed from rubber hydrochloride by casting a rubber hydrochloride solution onto a smooth surface, which comprises coating the opposite side of said sheet or film from that which contacted said smooth surface with a transparent film of a condensation derivative of rubber of the type obtainable by the reaction between rubber and a halide of an amphoteric metal.

18. The method of increasing the transparency and clarity of a sheet or film prepared by casting a rubber hydrochloride solution onto a smooth surface and drying the same, which comprises applying to said sheet or film a solution of a transparent film forming material and evaporating solvent therefrom to leave a continuous relatively thin pellicle over said rubber hydrochloride sheet or film.

19. The method of increasing the transparency and clarity of a sheet or film prepared by casting a rubber hydrochloride solution onto a smooth surface and drying the same, which comprises applying to said sheet or film a solution of a transparent film forming material including a condensation derivative of rubber in a solvent that is not a solvent for rubber hydrochloride and evaporating said solvent therefrom to leave a continuous relatively thin pellicle over said rubber hydrochloride sheet or film.

20. The method of increasing the transparency and clarity of a sheet or film prepared by casting a rubber hydrochloride solution onto a smooth surface and drying the same, which comprises applying to said sheet or film a solution of a transparent film forming material including a condensation derivative of rubber of the type obtainable by the reaction between rubber and a halide of an amphoteric metal and evaporating said solvent therefrom to leave a continuous relatively thin pellicle over said rubber hydrochloride sheet or film.

21. Thin, transparent, flexible, self-sustaining sheet or film material suitable for wrapping purposes, comprising superimposed films integrally bonded together, one of said films being composed largely of rubber hydrochloride and another a condensation derivative of rubber.

22. Thin, transparent, flexible, self-sustaining sheet or film material suitable for wrapping purposes, comprising superimposed films integrally bonded together, one of said films being composed largely of rubber hydrochloride and another a condensation derivative of rubber of the type obtainable by the reaction between rubber and a halide of an amphoteric metal.

23. A composite product consisting of a ply composed essentially of a rubber hydrochloride integrally bonded to a ply composed essentially of an end product obtained from the reaction between rubber and a halide of an amphoteric metal.

24. A composite product consisting of a ply composed essentially of a rubber hydrochloride integrally bonded to a ply composed essentially of a condensation derivative of rubber.

25. A composite product consisting of a ply composed essentially of a rubber hydrochloride integrally bonded to a ply composed essentially of a condensation derivative of rubber of the type obtainable by the reaction between rubber and a halide of an amphoteric metal.

WILLIAM C. CALVERT.